UNITED STATES PATENT OFFICE.

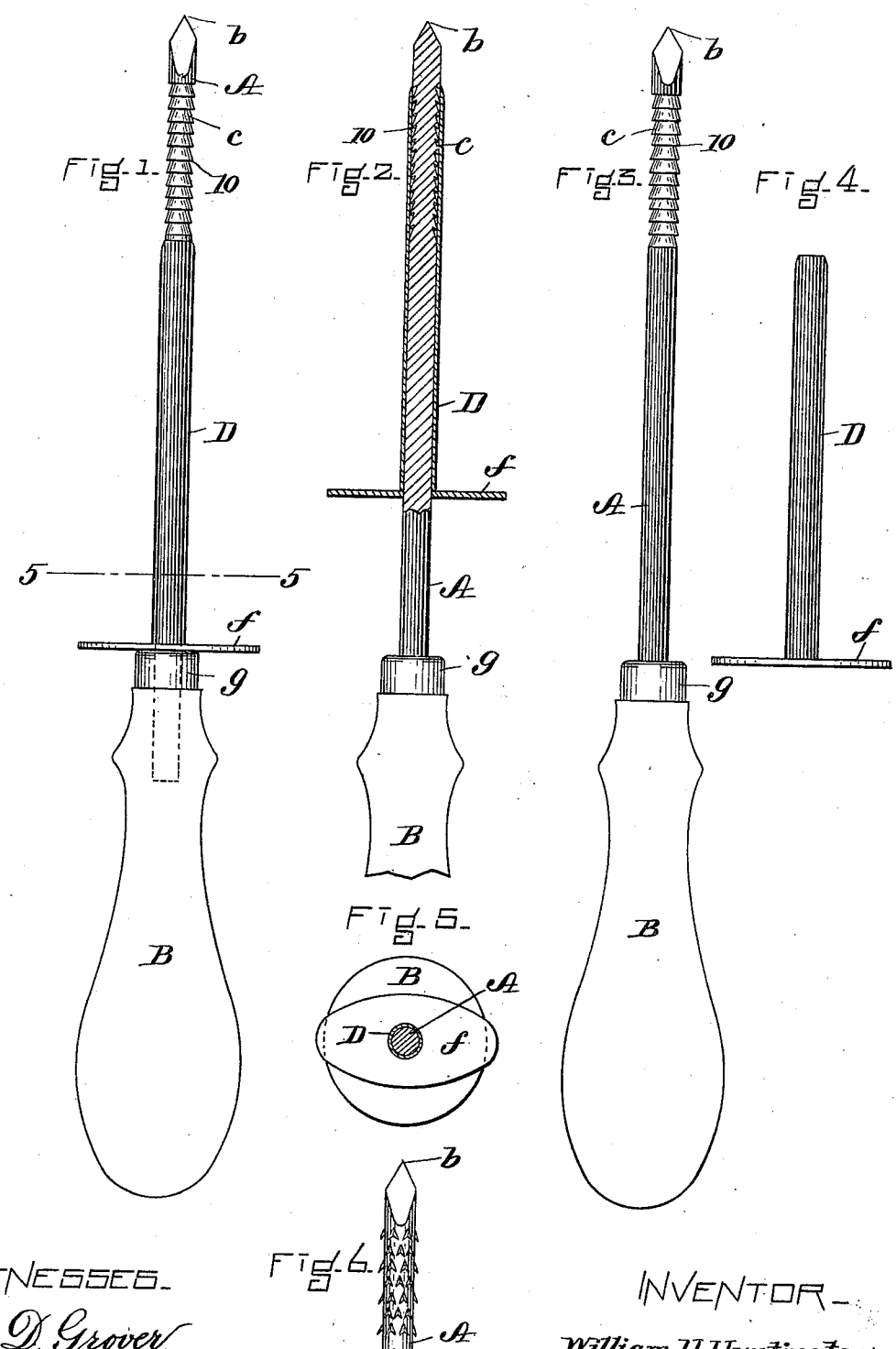

WILLIAM H. HUNTINGTON, OF BOSTON, MASSACHUSETTS.

IMPLEMENT FOR TESTING MEAT.

SPECIFICATION forming part of Letters Patent No. 644,248, dated February 27, 1900.

Application filed November 24, 1899. Serial No. 738,217. (No model.)

*To all whom it may concern:*

Be it known that I, WILLIAM H. HUNTINGTON, a citizen of the United States, residing at Boston, in the county of Suffolk and State of Massachusetts, have invented an Implement for Testing Meat, of which the following is a specification.

My invention has for its object to provide a simple and reliable implement for testing the interior portions of hams and other meats to ascertain their condition by withdrawing small portions of the same, thus disclosing any interior bruises or discolorations which could not otherwise be discovered until the meat was cut up.

To this end my invention consists in an implement of this character embodying certain novel features of construction, whereby the desired result is accomplished in a more reliable and effective manner than heretofore.

In the accompanying drawings, Figure 1 is a side elevation of my meat-testing implement. Fig. 2 is a longitudinal section of the same with the covering-sleeve pushed forward to inclose its outer toothed or serrated end. Fig. 3 is an elevation of the implement, the covering-sleeve being removed. Fig. 4 is a view of the covering-sleeve detached. Fig. 5 is a transverse section on the line 5 5 of Fig. 1. Fig. 6 is a view of the outer pointed end of the rod or spindle, showing a modified form of tooth.

In the said drawings, A represents a steel rod or spindle provided at one end with a suitable handle B and having a sharp point $b$ at its opposite or outer end to enable it to be easily thrust into a ham or other piece of meat by means of the handle B. Immediately behind the point $b$ the rod or spindle A is provided with sharp teeth, burs, or backwardly-inclined projections properly formed to enable the spindle to be easily pushed into the meat, but which when the spindle is withdrawn will cut or tear off and retain small particles of the meat, thus affording samples or specimens of the interior portions of the same to show its condition. These teeth or serrations may consist of a series of parallel undercut annular grooves $c$, having sharp edges 10, adapted, as the spindle is withdrawn, to remove particles of the meat, which will fill the said grooves, or the spindle may be provided with rearwardly-inclined burs or teeth like those of a rasp, as shown in Fig. 6, or with teeth or projections of any suitable form which will cut or tear off particles of the meat as the spindle is drawn back and retain the same as specimens or samples of any portion of the interior of the meat which can be reached by the implement.

Over the spindle A is fitted to slide thereon a sleeve or sheath D of such length that when drawn back, by means of a cross bar or handle $f$, secured to its rear end, it will leave the toothed or serrated end of the spindle exposed, as shown in Fig. 1. The implement is then ready to be thrust into a ham or piece of meat to reach any portion of the interior of the same within the range of its length, after which it is drawn back slightly to tear off and gather particles of meat from the part to be tested. The sheath or covering-sleeve D is then pushed forward to inclose or cover the toothed or serrated end of the spindle with the particles of meat which have been removed thereby, when by taking hold of the handle B and placing a finger on the cross-bar $f$ the spindle and sheath can be withdrawn together, the sheath or cover thus preventing the particles of meat at the end of the spindle from being wiped off or mingled with other portions of the meat through which the implement passes as it is being withdrawn. The outer end of the sleeve D is tapered off to a thin edge, so as not to interfere with its free entrance into the meat, and when the sleeve is drawn back the cross-bar $f$ comes into contact with the ferrule $g$ of the handle, which thus forms a stop therefor.

The above-described implement will be found of great value to inspectors of meat, packers, and butchers, as any interior bruises or discolorations can by its use be readily detected, thus enabling the exact condition of the meat to be discovered before it is cut up.

What I claim as my invention, and desire to secure by Letters Patent, is—

1. A meat-tester, comprising a rod or spindle having a penetrating-point at one end, a handle at its opposite end, and sharp teeth or projections in rear of the point and adapted in the withdrawal of the implement to remove and retain particles of the meat, and a tubular sheath surrounding the rod or spindle between said teeth and the handle and adapted to be slid outwardly to completely cover the toothed portion of the rod or spindle and retain the particles of meat in the teeth.

2. A meat-tester, comprising a rod or spindle having a penetrating-point at one end, a handle at its opposite end, and provided in rear of its point with sharp teeth or projections adapted, in the withdrawal of the implement, to remove and retain particles of meat, and a tube inclosing the rod or spindle between its handle and teeth and provided at its inner end with a handle, said tube being adapted to be slid outwardly and inclose the toothed portion of the rod or spindle and retain the particles of meat in the teeth.

Witness my hand this 22d day of November, A. D. 1899.

WILLIAM H. HUNTINGTON.

In presence of—
P. E. TESCHEMACHER,
L. I. BASFORD.